United States Patent
Pearce et al.

(10) Patent No.: US 9,091,227 B2
(45) Date of Patent: Jul. 28, 2015

(54) LEAK DETECTION BASED ON FUEL LEVEL

(71) Applicant: Ford Global Technologies, LLC, Dearborn, MI (US)

(72) Inventors: Russell Randall Pearce, Ann Arbor, MI (US); Scott A. Bohr, Plymouth, MI (US); Aed M. Dudar, Canton, MI (US); Dennis Seung-Man Yang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 96 days.

(21) Appl. No.: 13/945,611

(22) Filed: Jul. 18, 2013

(65) Prior Publication Data

US 2015/0025722 A1    Jan. 22, 2015

(51) Int. Cl.
*F02D 41/22* (2006.01)
*B60W 20/00* (2006.01)

(52) U.S. Cl.
CPC .............. *F02D 41/22* (2013.01); *B60W 20/50* (2013.01); *Y10S 903/905* (2013.01)

(58) Field of Classification Search
CPC ..... F02D 41/22; B60W 20/50; Y10S 903/905
USPC ................. 701/22, 102, 33.2, 32.8; 123/520; 702/51
See application file for complete search history.

(56) References Cited

U.S. PATENT DOCUMENTS

| | | | |
|---|---|---|---|
| 5,408,866 A * | 4/1995 | Kawamura et al. | 73/40 |
| 5,495,749 A * | 3/1996 | Dawson et al. | 73/49.7 |
| 5,637,788 A | 6/1997 | Remboski et al. | |
| 6,202,478 B1 * | 3/2001 | Blomquist et al. | 73/49.7 |
| 6,283,098 B1 * | 9/2001 | Corkill | 123/520 |
| 6,658,923 B2 * | 12/2003 | Fabre | 73/114.18 |
| 7,685,867 B2 * | 3/2010 | Tsuyuki et al. | 73/49.7 |
| 8,019,525 B2 * | 9/2011 | Debastos et al. | 701/102 |
| 8,397,552 B2 * | 3/2013 | Jackson et al. | 73/49.3 |
| 2002/0011094 A1 | 1/2002 | Cook et al. | |
| 2011/0139130 A1 * | 6/2011 | Siddiqui | 123/520 |
| 2012/0079873 A1 * | 4/2012 | Jackson et al. | 73/49.3 |

* cited by examiner

*Primary Examiner* — Mary Cheung
*Assistant Examiner* — Michael Berns
(74) *Attorney, Agent, or Firm* — James Dottavio; Alleman Hall McCoy Russell & Tuttle LLP

(57) ABSTRACT

Methods and systems for fuel system leak detection are disclosed. In one example approach, a method comprises, during an engine-on condition, delivering fuel from a fuel tank to one or more cylinders of the engine while the fuel tank is sealed off from atmosphere, and indicating a leak based on pressure in the fuel tank. For example, a leak may be indicated in response to a pressure decrease in the fuel tank greater than an expected pressure decrease, where the expected pressure decrease is based on a fuel level in the fuel tank.

19 Claims, 4 Drawing Sheets

LEAK DETECTION BASED ON FUEL LEVEL

BACKGROUND/SUMMARY

A vehicle with an engine may include an evaporative emission control system coupled to a fuel system in order to reduce fuel vapor emissions. For example, an evaporative emission control system may include a fuel vapor canister coupled to a fuel tank which includes a fuel vapor adsorbent for capturing fuel vapors from the fuel tank while providing ventilation of the fuel tank to the atmosphere.

Leak testing may be periodically performed on such evaporative emission control systems in order to identify leaks in the system so that maintenance may be performed and mitigating actions may be taken in order to reduce emissions. In some approaches, leak testing may be performed using active leak testing systems which include various components such as one or more pumps. For example, an evaporative leak testing module (ELCM) may be included in a vehicle to determine leak testing based on a reference orifice size.

The inventors herein have recognized that such approaches to leak testing may not be capable of detecting leaks with a size less than a threshold size, e.g. such systems may not be capable of detecting 0.010" orifice leaks due to limitations of components in the leak detection system. For example, an ELCM may only be able to detect leaks with an orifice size greater than or equal to 0.020". The inability of leak detection systems to detect such small leaks may lead to increased emissions and potential degradation of engine operation due to undetected leaks.

In order to at least partially address these issues, methods for diagnosing leaks in an engine with an evaporative emission control system are provided. In one example approach, a method comprises, during an engine-on condition, delivering fuel from a fuel tank to one or more cylinders of the engine while the fuel tank is sealed off from atmosphere, and indicating a leak based on pressure in the fuel tank. For example, a leak may be indicated in response to a pressure decrease in the fuel tank greater than an expected pressure decrease, where the expected pressure decrease is based on a fuel level in the fuel tank.

In this way, leak detection for very small leaks, e.g., leaks with a size less than a threshold detectable by leak diagnostic components such as an ELCM, may be performed. Further, in such an approach leak detection may be performed without additional components such as additional pumps, fuel reservoirs, leak check modules, etc., thereby potentially reducing costs associated with additional leak diagnostic components. Further, in some examples, such an approach may be used in addition to other leak diagnostic approaches to increase accuracy of leak testing and/or as an initial screening, e.g., to determine if a potential leak is present before performing an active leak test which consumes power.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
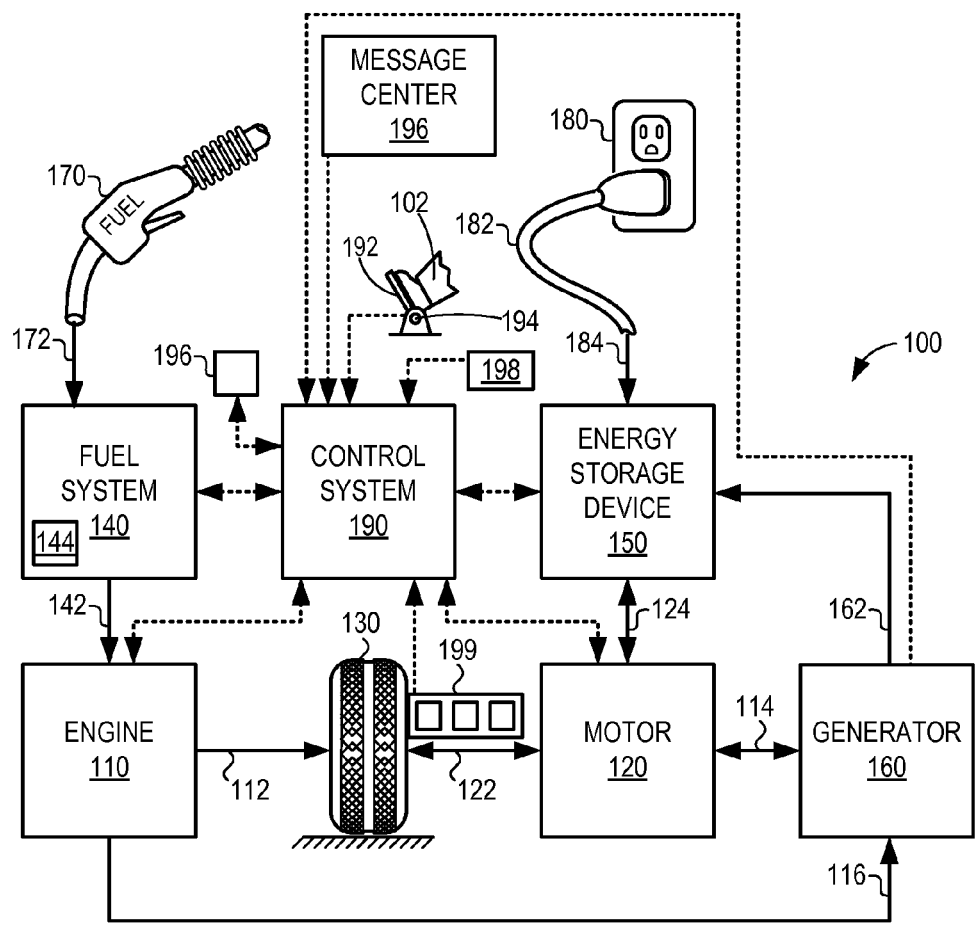
FIG. 1 shows an example vehicle propulsion system.
Figure 2:
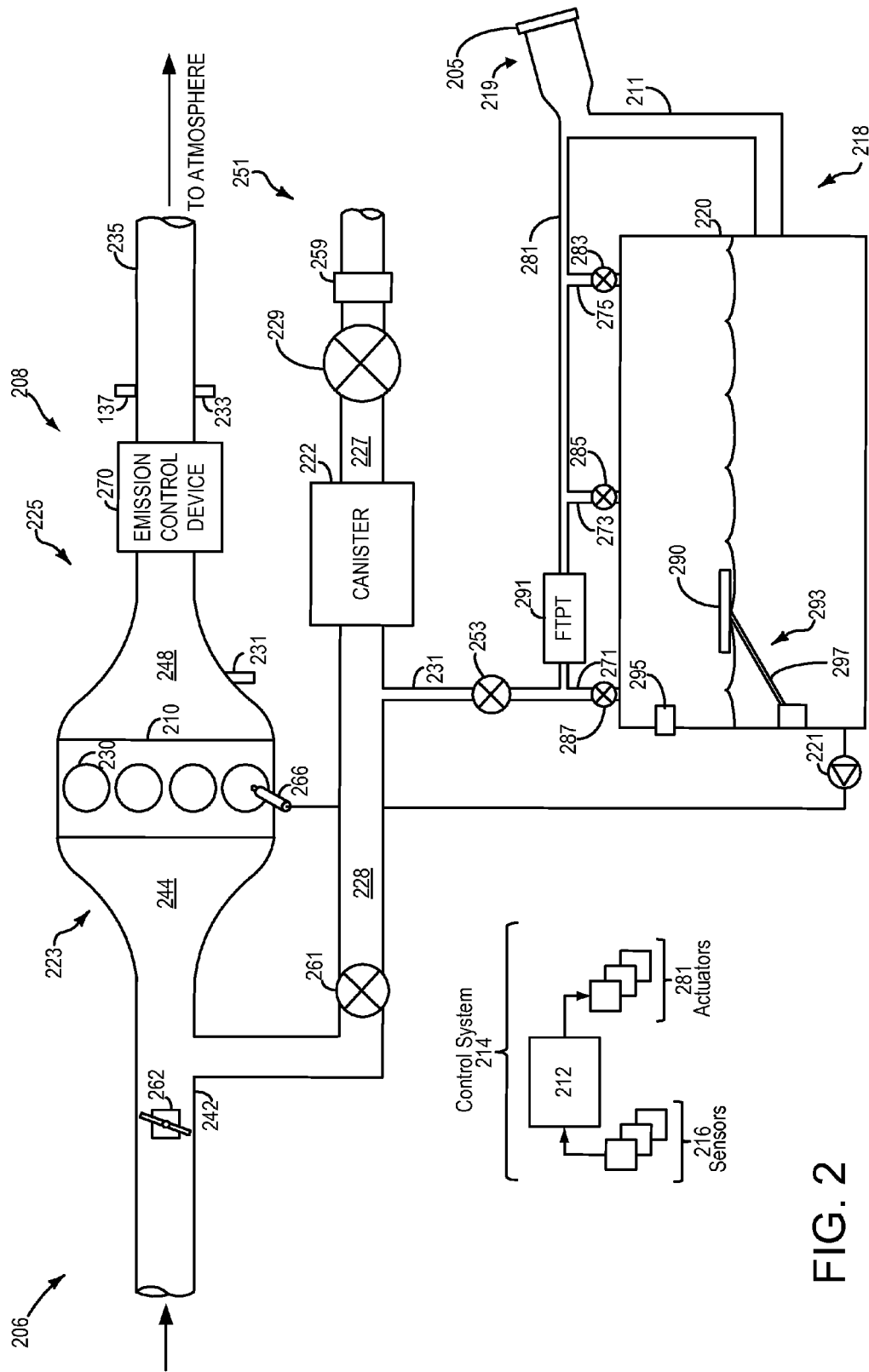
FIG. 2 shows an example vehicle system with a fuel emission control system.
Figure 3:
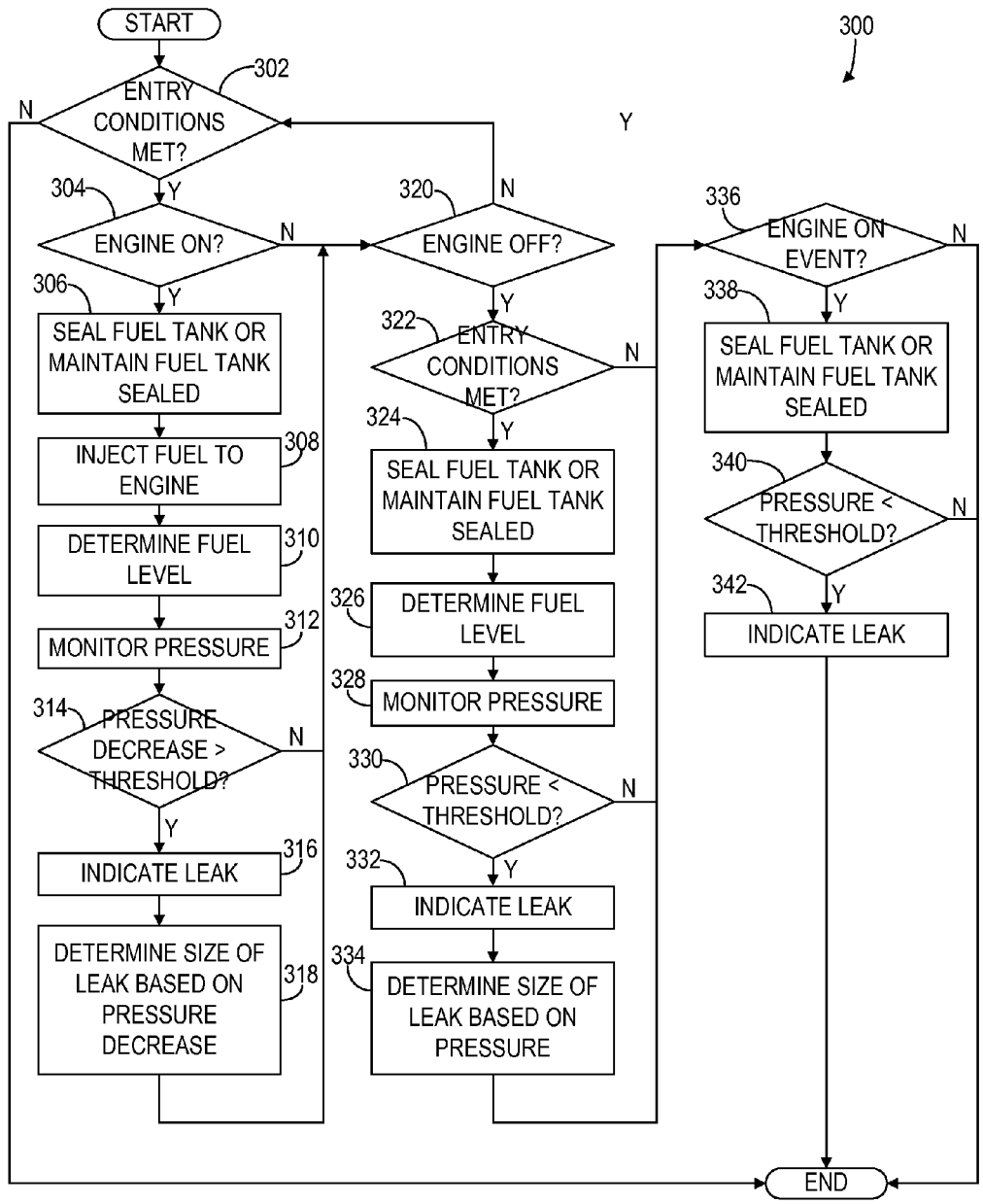
FIG. 3 shows an example method for operating a vehicle with an engine in accordance with the disclosure.
Figure 4:
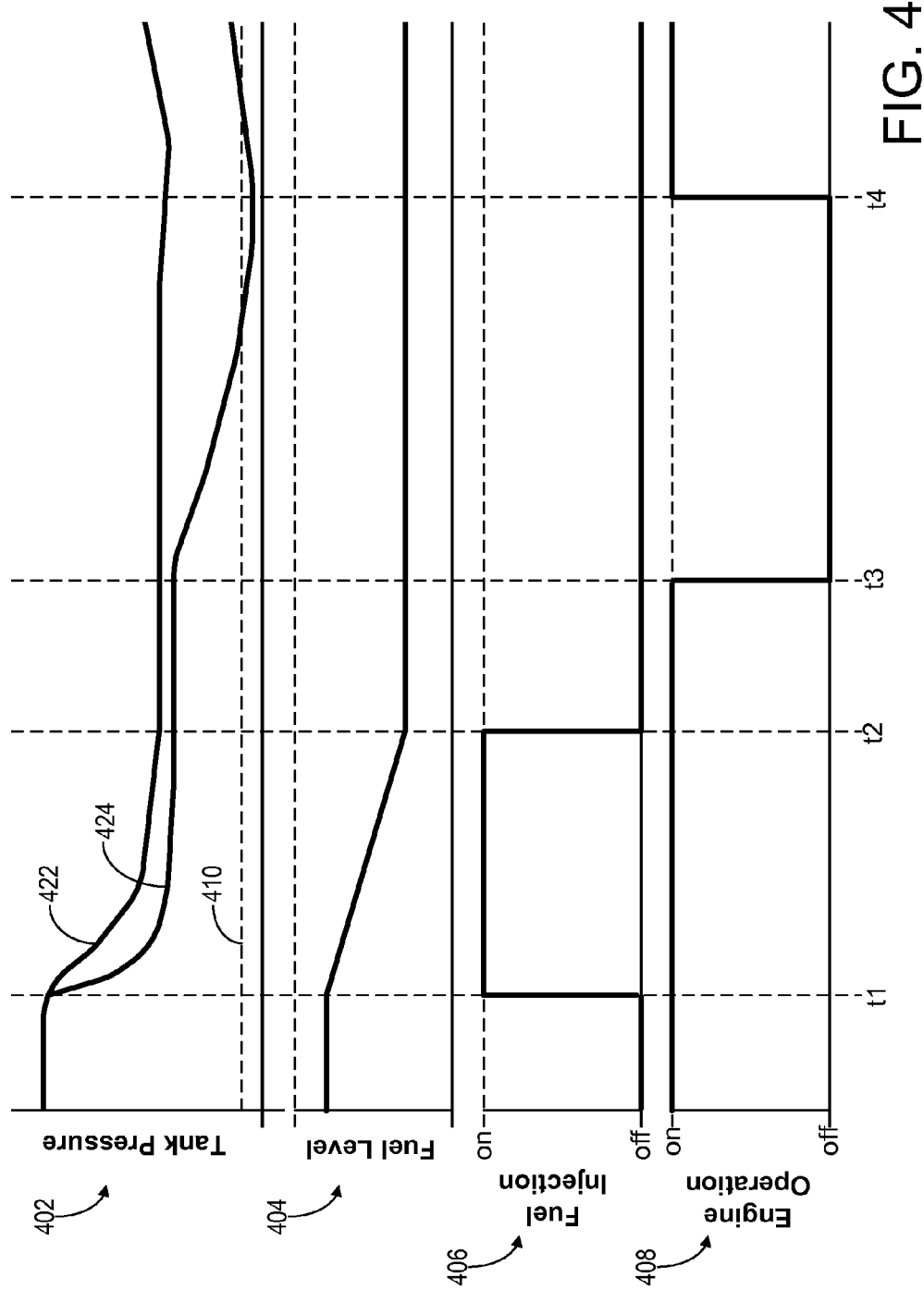
FIG. 4 illustrates leak testing based on fuel level and pressure in a fuel tank in accordance with the disclosure.

The following description relates to systems and methods for performing leak diagnostics in a vehicle system with an engine, such as the vehicle shown in FIG. 1 and the engine system shown in FIG. 2. During engine operation when fuel is injected to one or more cylinders of the engine, the fuel level in a fuel tank decreases leading to an increase in a vapor volume in the fuel tank. This increase in vapor volume in the fuel tank causes a decrease in pressure in the fuel tank, e.g., based on the ideal gas law PV=nRT. As shown in FIGS. 3 and 4, this decrease in pressure in the fuel tank due to fuel injection to the engine may be monitored and compared to an expected pressure decrease, where the expected pressure decrease is based on a fuel level in the tank and a temperature in the fuel tank, to diagnose leaks in the fuel tank or in an evaporative emissions control system coupled to the fuel tank.

Turning now to the figures, FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g. gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g. E10, E85, etc.) or a blend of gasoline and methanol (e.g. M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. As will be described by the process flow of FIG. 3, control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g. not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g. as identified by the fuel level sensor) may be communicated to the vehicle operator, for example, via a fuel gauge or indication lamp indicated at 196.

The vehicle propulsion system 100 may also include a message center 196, ambient temperature/humidity sensor 198, and a roll stability control sensor, such as a lateral and/or longitudinal and/or yaw rate sensor(s) 199. The message center may include indicator light(s) and/or a text-based display in which messages are displayed to an operator. The message center may also include various input portions for receiving an operator input, such as buttons, touch screens, voice input/recognition, etc. In an alternative embodiment, the message center may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

FIG. 2 shows a schematic depiction of a vehicle system 206. The vehicle system 206 includes an engine system 208 coupled to an emissions control system 251 and a fuel system 218. Emission control system 251 includes a fuel vapor canister 222 which may be used to capture and store fuel vapors. In some examples, vehicle system 206 may be a hybrid electric vehicle system such as the vehicle system shown in FIG. 1. However, in other examples, vehicle system 206 may not be a hybrid electric vehicle system.

The engine system 208 may include an engine 210 having a plurality of cylinders 230. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system.

Fuel tank 220 may include a fuel level sensor 203 configured to determine a fuel level or amount of liquid fuel contained in the fuel tank. For example, fuel level sensor 293 may include a float 290 coupled to an arm 297 so that a height of liquid fuel in the tank may be determined to infer the volume of liquid fuel in the tank. Fuel tank 220 may additionally include one or more temperature sensors. For example, fuel tank 220 may include a temperature sensor 295 for determining a temperature of the vapor space above the liquid fuel in the tank.

Vapors generated in fuel system 218 may be routed to an evaporative emissions control system 251 which includes a fuel vapor canister 222 via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275. Further, in some examples, one or more fuel tank isolation valves may be included in recovery line 231 or in conduits 271, 273, or 275. Among other functions, fuel tank isolation valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283, and/or conduit 231 may include an isolation valve 253. Further, in some examples, recovery line 231 may be coupled to a fuel filler system 219. In some examples, fuel filler system may include a fuel cap 205 for sealing off the fuel filler system from the atmosphere. However, in other examples, fuel filler system 219 may be a capless fuel filler system. Refueling system 219 is coupled to fuel tank 220 via a fuel filler pipe or neck 211.

A fuel tank pressure transducer (FTPT) 291, or fuel tank pressure sensor, may be included between the fuel tank 220 and fuel vapor canister 222, to provide an estimate of a fuel tank pressure. As described below, in some examples, during engine-on conditions and/or during engine-off conditions, sensor 291 may be used to monitor changes in pressure and/or vacuum in the fuel system to determine if a leak is present. The fuel tank pressure transducer may alternately be located in vapor recovery line 231, purge line 228, vent line 227, or other location within emission control system 251 without affecting its engine-off leak detection ability.

Emissions control system 251 may include one or more emissions control devices, such as one or more fuel vapor canisters 222 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake 244 is provided to the fuel vapor canister for purging. In some examples, vent line 227 may include an air filter 259 disposed therein upstream of a canister 222. In some examples, an evaporative leak check module (ELCM) may be included in the fuel system or evaporative emissions control system. For example, an ELCM may be disposed in vent conduit 227 and may be configured to assist in leak diagnostics. For example, an ELCM may include a pump which is operated to determine a reference pressure based on a predetermined orifice size so that leaks may be detected by monitoring pressure in the emissions control system relative to the reference pressure. However, in some examples, vehicle system 206 may not include an ELCM and may instead only perform leak testing based on a fuel level and pressure in the fuel tank as described below with regard to FIGS. 3 and 4.

Flow of air and vapors between canister 222 and the atmosphere may be regulated by a canister vent valve 229. Canister vent valve may be a normally open valve so that fuel tank isolation valve 253 may be used to control venting of fuel tank 220 with the atmosphere. For example, in hybrid vehicle applications, isolation valve 253 may be a normally closed valve so that by opening isolation valve 253, fuel tank 220 may be vented to the atmosphere and by closing isolation valve 253, fuel tank 220 may be sealed from the atmosphere. In some examples, isolation valve 253 may be actuated by a solenoid so that, in response to a current supplied to the solenoid, the valve will open. For example, in hybrid vehicle applications, the fuel tank 220 may be sealed off from the atmosphere in order to contain diurnal vapors inside the tank since the engine run time is not guaranteed. Thus, for example, isolation valve 253 may be a normally closed valve which is opened in response to certain conditions. For example, isolation valve 253 may be commanded open during a refueling event.

The vehicle system 206 may further include a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 295, fuel level sensor 293, and pressure sensor 291. Other sensors such as pressure, temperature, air/fuel ratio, and composition sensors may be coupled to various locations in the vehicle system 206. As another example, the actuators may include fuel injector 266, throttle 262, fuel tank isolation valve 253, and pump 221. The control system 214 may include a controller 212. The controller may receive input data from the various sensors, process the input data, and trigger the actuators in response to the processed input data based on instruction or code programmed therein corresponding to one or more routines. An example control routine is described herein with regard to FIG. 3.

FIG. 3 shows an example method 300 for performing leak diagnostics based on a fuel level and pressure in a fuel tank. For example, method 300 may be used to diagnose very small leaks, e.g., leaks with a size less than a threshold detectable by leak diagnostic components such as an ELCM. In some examples, the leak detection routine shown in FIG. 3 may be solely used to diagnose leaks in an evaporative emission control system, e.g., in a vehicle system which does not include an ELCM. However, in other examples, method 300 may be used in addition to other leak diagnostic approaches to increase accuracy of leak testing and/or as an initial screening, e.g., to determine if a potential leak is present before performing an active leak test which consumes power. Since method 300 may be performed based only on temperature and fuel level sensor readings, e.g., via temperature sensor 295 and via fuel level sensor 293 in fuel tank 220, it may be desirable to first perform leak testing using method 300 and then, if a leak is indicated, perform an additional leak test, e.g., using an active leak detection system. In this way, frequency of leak testing performed by power consuming components may be reduced.

At 302, method 300 includes determining if entry conditions for leak testing are met. Entry conditions may be based on temperatures in the fuel system or evaporative emission control system, For example, entry conditions may include determining if a temperature in the fuel system is in a predetermined range of temperatures. For example, if the temperatures are below a lower temperature threshold or above an upper temperature threshold then method 300 may end. As another example, entry conditions for performing a leak test may be based on when a previous leak test was performed. For example, leak tests may be scheduled to occur at predetermined time intervals or following a prescribed schedule thus may be based on a time duration greater than a threshold time duration since a previous leak test was performed.

If entry conditions are met at 302, method 300 proceeds to 304. At 304, method 300 includes determining if engine-on conditions are present. Engine-on conditions may include any vehicle conditions where the engine is in operation. In some examples, engine-on conditions may be based on a vehicle operator input, e.g., a vehicle operator may perform a key-on or press an engine start button to initiate engine-on conditions. As another example, a hybrid electric vehicle may transition from engine-off conditions, where the engine is off but the vehicle is propelled via an auxiliary power source, to an engine-on condition, where the vehicle is propelled by engine operation. If engine-on conditions are present at 304, method 300 proceeds to 306.

At 306, method 300 includes sealing the fuel tank from the atmosphere or maintaining the fuel tank sealed from the atmosphere. For example, a canister vent valve, e.g., valve 229, may be closed or maintained in a closed position to that the fuel tank is not in communication with the atmosphere. In some examples, the fuel tank may remain sealed off from the atmosphere except during certain conditions, such as during a refueling event when the engine is off.

At 308, method 300 includes injecting fuel to the engine. For example, during engine operation, fuel pump 221 may be actuated to deliver fuel to one or more fuel injectors, e.g., injector 266, coupled to one or more cylinders, e.g., cylinder 230, in the engine for delivery therein. Injecting fuel to the engine may comprise injecting an amount of fuel for a duration to the engine, e.g., injection of fuel to the engine may comprise a plurality of fuel injections to cylinders of the engine during engine operation. In this way, during the engine-on condition, fuel is delivered from the fuel tank to one or more cylinders of the engine while the fuel tank is sealed off from atmosphere.

At 310, method 300 includes determining a fuel level in the fuel tank. For example, a fuel level sensor, e.g., sensor 293, may be used to monitor a fuel level in the fuel tank before, during, and after fuel is delivered to the engine cylinder during engine operation. This fuel level may be used to determine a volume of vapor space in the fuel tank as the fuel level changes due to the injection of fuel to the engine. In particular, as fuel is injected to the engine, the vapor volume in the fuel tank, as determined by the fuel level sensor, may increase since the fuel level decreases. This increase in the fuel vapor volume in the fuel tank together with a temperature of the fuel tank, e.g., as measured by temperature sensor 295, may be used to determine an expected pressure decrease in the fuel tank via the ideal gas law, $PV=nRT$. In some examples, the expected pressure decrease may be further based on an ambient temperature in addition to a temperature in the fuel tank to determine a volume of fuel vapor in the fuel tank from which the expected pressure decrease is inferred. As described below, this expected pressure in the fuel tank based on the fuel level may be used to diagnose leaks in the fuel system.

At 312, method 300 includes, monitoring pressure in the fuel tank. For example, the pressure in the fuel tank may be monitored via FTPT sensor 291 during and after delivery of fuel from the fuel tank to the engine to determine an actual amount of pressure decrease occurring in the tank due to the decrease in fuel level in the tank. This pressure in the fuel tank may be compared to an expected pressure in the fuel tank inferred from the fuel level to diagnose leaks.

At 314, method 300 includes determining if a pressure decrease in the fuel tank is greater than a threshold. For example, the actual pressure decrease in the fuel tank as determined by a pressure sensor in the fuel tank may be compared to the expected pressure decrease described above. If a leak is present in the fuel system, then the actual pressure decrease in the fuel tank may be greater than the expected pressure decrease. If a pressure decrease is not greater than a threshold at 314, method 300 proceeds to 320 described below. However, if a pressure decrease in the fuel tank is greater than the threshold at 314, method 300 proceeds to 316.

At 316, method 300 includes indicating a leak. For example, a leak may be indicated in response to a pressure decrease in the fuel tank greater than the expected pressure decrease, where the expected pressure decrease is based on a fuel level in the fuel tank. In some examples, the expected pressure decrease may be obtained from a lookup table based on a temperature in the fuel tank and fuel level in the fuel tank. Such a look-up table may comprise calibration data for expected pressure decreases in the system at different fuel levels and temperatures. However, in other examples, the expected pressure decrease may be calculated based on a suitable system model, e.g., via the ideal gas law $PV=nRT$ or other suitable pressure model. Further, in some examples, a leak may be indicated based on a rate of pressure decrease in the fuel tank greater than a threshold rate of pressure decrease, where the threshold rate of pressure decrease is based on a fuel level in the fuel tank and a temperature in the fuel tank.

Indicating a leak may further include indicating a degradation of the fuel system so that mitigating actions may be performed. For example, a diagnostic code may be set in an onboard diagnostics system in the vehicle and/or a message may be sent to a message center in the vehicle to alert a vehicle operator of the degradation in the fuel system.

In some examples, a comparison of the pressure decrease with the expected pressure decrease may be used to infer a size or diameter of a leak detected in the system. For example calibrated models may be used to approximate a size of the leak based on differences between the measured pressure decrease and the expected pressure decrease at different fuel levels and temperatures. Thus, at 318, method 300 may include determining a size of the leak based on the pressure decrease in the fuel tank. For example, the rate of pressure decrease may be correlated with a leak size so that a size of an indicated leak is determined based on the rate of pressure decrease. As another example, determining a size of the leak may be performed based on a comparison of a pressure in the fuel tank with an expected pressure, where the expected pressure is based on a fuel level in the fuel tank and a temperature in the fuel tank.

At 320, method 300 includes determining if engine-off conditions are present. For example, following the engine-on conditions described above, a vehicle operator may provide input to initiate engine-off conditions subsequent to the engine-on conditions. For example, a vehicle operator may perform a key-off or press an engine-off button to turn off the engine. As another example, in HEV applications, a vehicle may transition from engine-on conditions to engine-off conditions, e.g., in response to vehicle speed or load or in response to a state-of-charge of an onboard battery. If engine-off conditions are present at 320, method 300 proceeds to 322.

At 322, method 300 includes determining if entry conditions for performing leak testing during engine-off conditions are met. Entry conditions for performing leak testing during engine-off conditions may be based on a pressure in the fuel tank at an initiation of the engine-off conditions. For example, entry conditions for performing leak testing during engine-off conditions may include a pressure in the fuel tank greater than a threshold pressure at a key-off or other engine-off initiation event. Entry conditions may be further based on temperatures in the fuel system or evaporative emission control system during the engine-off conditions. For example, entry conditions during engine-off conditions may be based on a temperature in the fuel system less than a threshold temperature or greater than a threshold temperature. For example, entry conditions may include determining if a temperature in the fuel system is in a predetermined range of temperatures. For example, if the temperatures are below a lower temperature threshold or above an upper temperature threshold then method 300 may end. As still another example, entry conditions for performing leak testing during engine-off conditions may be based on whether or not a leak test was performed during the previous engine-on condition. For example, if a leak test was performed during an engine-on condition immediately preceding the engine-off condition then a leak test may not be performed.

If entry conditions for performing leak testing during engine-off conditions are not met at 322, method 300 may proceed to 336 described below. However, if entry conditions for performing leak testing during engine-off conditions are met at 322, method 300 proceeds to 324. At 324, method 300 includes sealing the fuel tank from the atmosphere or maintaining the fuel tank sealed from the atmosphere. For example, a canister vent valve, e.g., valve 229, may be closed or maintained in a closed position to that the fuel tank is not in communication with the atmosphere. In some examples, the fuel tank may remain sealed off from the atmosphere except during certain conditions, such as during a refueling event when the engine is off. In some examples, if a refueling event is initiated during engine-off conditions, leak testing may be discontinued and the fuel tank may be vented to the atmosphere.

At 326, method 300 includes determining fuel level in the fuel tank. For example, a fuel level sensor, e.g., sensor 293, may be used to monitor a fuel level in the fuel tank immediately following an initiation of the engine-off conditions. As remarked above, this fuel level in combination with a temperature in the fuel system may be used to determine an expected pressure in the fuel tank which is used to diagnose leaks.

At 328, method 300 includes monitoring pressure in the fuel tank. For example, the pressure in the fuel tank may be monitored via FTPT sensor 291 after initiation of the engine-off conditions to determine an actual amount of pressure the fuel tank following initiation of the engine-off conditions. In particular, during engine operation, even if a leak is present in the fuel system, pressure in the fuel tank may increase due to heat input from the engine. However, if a leak is present, then pressure in the fuel tank may decrease rapidly following an engine-off event while the fuel tank is sealed.

Thus, At 330, method 300 includes determining if pressure in the fuel tank is less than a threshold. The threshold may be the expected pressure in the fuel tank following the engine-off event, e.g., following a key-off event, based on the fuel level and temperature in the fuel tank. If pressure in the fuel tank is not less than the threshold at 330, method 300 proceeds to 336 described below. However, if pressure in the fuel tank is less than the threshold at 330, method 300 proceeds to 332.

At 332, method 300 includes indicating a leak. For example, during the engine-off condition subsequent to the engine-on condition, a leak may be indicated based on a pressure in the fuel tank less than a threshold pressure. As another example, a leak may be indicated in response to a pressure decrease in the fuel tank greater than the expected pressure decrease, where the expected pressure decrease is based on a fuel level in the fuel tank. In some examples, the expected pressure decrease may be obtained from a lookup table as described above or may be calculated based on a suitable system model. Further, in some examples, a leak may be indicated based on a rate of pressure decrease in the fuel tank greater than a threshold rate of pressure decrease, where the threshold rate of pressure decrease is based on a fuel level in the fuel tank and a temperature in the fuel tank. Further, as remarked above, indicating a leak may include indicating a degradation of the fuel system so that mitigating actions may be performed. For example, a diagnostic code may be set in an onboard diagnostics system in the vehicle and/or a message may be sent to a message center in the vehicle to alert a vehicle operator of the degradation in the fuel system.

At 334, method 300 may include determining a size of the leak based on the pressure decrease in the fuel tank. For example, the rate of pressure decrease following the engine-off initiation event may be correlated with a leak size so that a size of an indicated leak is determined based on the rate of pressure decrease. As another example, determining a size of the leak may be performed based on a comparison of a pressure in the fuel tank with an expected pressure, where the expected pressure is based on a fuel level in the fuel tank and a temperature in the fuel tank.

At 336, method 300 includes determining if an engine-on event occurs. For example, following engine-off conditions, an engine-on event may occur where the engine is started. For example, a vehicle operator may provide input to start the vehicle from rest, e.g., by performing a key-on or pressing a start button. As another example, a hybrid electric vehicle may transition from engine-off conditions, where the engine is off but the vehicle is propelled via an auxiliary power source, to an engine-on condition, where the vehicle is propelled by engine operation. If an engine-on event occurs at 336, method 300 proceeds to 338.

At 338, method 300 includes sealing the fuel tank from the atmosphere or maintaining the fuel tank sealed from the atmosphere. For example, a canister vent valve, e.g., valve 229, may be closed or maintained in a closed position to that the fuel tank is not in communication with the atmosphere.

At 340, method 300 includes determining if pressure in the fuel tank is less than a threshold. For example, if a leak is present in the fuel system, then the pressure in the fuel tank may decrease below a predetermined threshold pressure, e.g., the pressure in the fuel tank may decrease to substantially zero after duration following an engine-off initiation event. This threshold pressure may be based on a time duration of the engine-off conditions immediately preceding the engine-on event. For example, the threshold pressure may decrease in response to an increase in duration of the prior engine engine-off conditions. If pressure in the fuel tank is less than the threshold at 340, method 300 proceeds to 342 to indicate a leak.

FIG. 4 illustrates leak testing based on fuel level and pressure as described above with regard to FIG. 3. At 402, FIG. 4 shows an example graph of fuel tank pressure, e.g., as measure by FTPT sensor 291, versus time. At 404, FIG. 4 shows an example graph of a fuel level, e.g., as measured by fuel level sensor 293, versus time. At 406, FIG. 4 shows an example graph of fuel injection to the engine versus time. At 408, FIG. 4 shows an example graph of engine operation versus time.

At time t1 in FIG. 4, a leak test during engine-on conditions is initiated so that fuel is injected to one or more cylinders of the engine between time t1 and t2. The delivery of fuel from the fuel tank to the engine between time t1 and t2 causes the fuel level in the fuel tank to decrease from time t1 to t2 leading to a corresponding decrease in pressure in the fuel tank. At 402 in FIG. 4, an example pressure signal for a case where there is no leak in the fuel system is shown at 422 and an example pressure signal for a case where there is a leak in the system is shown at 424. By monitoring the pressure decrease in the fuel tank during delivery of fuel from the fuel tank to the engine between times t1 and t2, the pressure decrease in the fuel tank may be used to determine whether a leak is present or not. For example, a leak may be indicated in response to a pressure decrease in the fuel tank greater than an expected pressure decrease. Here, the expected pressure decrease may correspond to the case where there is no leak in the system as shown by pressure curve 422 and the actual pressure decrease may correspond to the pressure curve 424 so that a leak is indicated.

At time t3, an engine-off initiation event occurs, e.g., a key-off. Following the engine-off event at time t3, if a leak is present in the system, then pressure in the fuel tank may decrease below a threshold pressure 410 within a predetermined period of time. In response to the pressure in the fuel tank falling below the threshold pressure 410 during engine-off conditions, a leak may be indicated. At time t4, an engine-on event, e.g., a key-on, occurs and the engine is again put into operation. Following the engine-on event, pressure in the fuel tank may increase due to heat generated by engine operation, even when a leak is present. Following this increase in pressure in the fuel tank, pressure in the tank may again be monitored during a subsequent fuel injection to determine if any leaks persist in the system.

It will be appreciated that the configurations and methods disclosed herein are exemplary in nature, and that these specific embodiments are not to be considered in a limiting sense, because numerous variations are possible. For example, the above technology can be applied to V-6, 1-4, 1-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle with an engine, comprising:
during an engine-on condition, delivering fuel from a fuel tank to one or more cylinders of the engine while the fuel tank is sealed off from atmosphere; and
indicating a leak based on pressure in the fuel tank being less than a threshold during an engine-on event where the engine-on event is subsequent to an engine-off condition following the engine-on condition.

2. The method of claim 1, further comprising indicating a leak in response to a pressure decrease in the fuel tank greater than an expected pressure decrease, where the expected pressure decrease is based on a fuel level in the fuel tank.

3. The method of claim 2, wherein the expected pressure decrease is further based on a temperature in the fuel tank, and wherein the delivering of fuel includes delivering fuel to all engine cylinders at a fuel flow rate above a non-zero upper threshold.

4. The method of claim 3, wherein the expected pressure decrease is further based on an ambient temperature.

5. The method of claim 2, wherein the expected pressure decrease is obtained from a lookup table based on a temperature in the fuel tank and fuel level in the fuel tank.

6. The method of claim 1, further comprising indicating a leak based on a rate of pressure decrease in the fuel tank greater than a threshold rate of pressure decrease.

7. The method of claim 6, wherein the threshold rate of pressure decrease is based on a fuel level in the fuel tank and a temperature in the fuel tank.

8. The method of claim 1, further comprising determining a size of the leak based on a rate of pressure decrease in the fuel tank.

9. The method of claim 1, further comprising determining a size of the leak based on a comparison of a pressure in the fuel tank with an expected pressure, where the expected pressure is based on a fuel level in the fuel tank and a temperature in the fuel tank.

10. The method of claim 1, further comprising, during an engine-off condition subsequent to the engine-on condition, indicating a leak based on a pressure in the fuel tank less than a threshold pressure.

11. The method of claim 1, further comprising indicating a leak based on a rate of pressure decrease in the fuel tank greater than a threshold rate of decrease following an engine-off event subsequent to the engine-on condition.

12. The method of claim 1, wherein the engine-on event is a key-on event.

13. A method for a vehicle with an engine and an evaporative emissions control system, comprising:
while operating the engine, delivering fuel from a fuel tank to all engine cylinders at a fuel flow rate above a non-zero upper threshold while the fuel tank is sealed off from atmosphere; and
indicating a leak in the evaporative emissions control system based on a pressure decrease in the fuel tank greater than an expected pressure decrease, where the expected pressure decrease is based on a fuel level in the fuel tank.

14. The method of claim 13, wherein the fuel level in the fuel tank is based on a fuel level reading of a fuel level sensor in the fuel tank, and where the fuel tank is sealed from an engine intake and any other gas conduit.

15. The method of claim 13, further comprising determining a size of the leak based on a comparison of the pressure decrease in the fuel tank with the expected pressure decrease.

16. The method of claim 13, wherein the vehicle is a plug-in hybrid electric vehicle.

17. A method for a vehicle with an engine, comprising:
during an engine-on condition, delivering fuel from a fuel tank to one or more cylinders of the engine at a fuel flow rate above a non-zero upper threshold while the fuel tank is sealed off from atmosphere; and
during an engine-off condition subsequent to the engine-on condition, maintaining the fuel tank sealed off from the atmosphere and indicating a leak in response to a pressure decrease in the fuel tank greater than an expected pressure decrease, where the expected pressure decrease is based on a fuel level in the fuel tank.

18. The method of claim 17, wherein the expected pressure decrease is further based on a temperature in the fuel tank.

19. The method of claim 17, further comprising determining a size of the leak based on a comparison of the pressure decrease in the fuel tank with the expected pressure decrease.

\* \* \* \* \*